Figure 1:
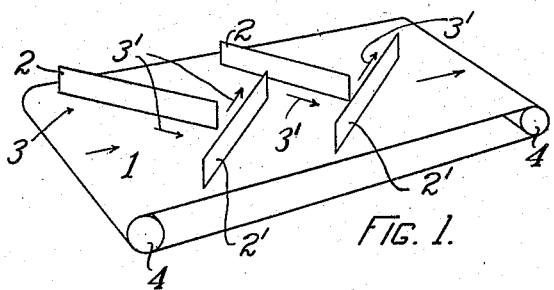

G. H. PETRI.
FORMING MACHINE FOR DOUGH.
APPLICATION FILED MAY 7, 1908.

936,660.  Patented Oct. 12, 1909.

WITNESSES
A. T. Palmer
William H. Moore

INVENTOR
GUNTHER H. PETRI
BY HIS ATTORNEYS
Mitchell Chadwick & Kent

UNITED STATES PATENT OFFICE.

GUNTHER H. PETRI, OF BOSTON, MASSACHUSETTS.

FORMING-MACHINE FOR DOUGH.

936,660.

Specification of Letters Patent.

Patented Oct. 12, 1909.

Application filed May 7, 1908. Serial No. 431,369.

*To all whom it may concern:*

Be it known that I, GUNTHER H. PETRI, a citizen of the United States, and a resident of Boston, in the county of Suffolk and State of Massachusetts, have invented certain new and useful Improvements in Forming Machines for Dough, of which the following is a specification.

This invention relates to forming machines for dough and other plastic materials.

More particularly it relates to machines for molding dough, forming a skin thereon and a shape suitable for rolls, loaves of bread, etc.

The object is to improve and simplify apparatus of this sort by eliminating troughs, reciprocating compressors and other features which have characterized apparatus heretofore known and which have had the effect of increasing the cost and complication of apparatus, of concealing the dough from observation while undergoing the process and rendering it not easily accessible for treatment with flour, etc., and which are not easily adjustable to meet the needs of differing sizes of loaves or consistency and quality of dough. These objects are accomplished by apparatus, one embodiment of which is shown herein and another embodiment of which is shown in my accompanying application for patent filed herewith, Serial No. 431,370, in which the main principle consists of the provision of two molding boards, one set with its working surface edgewise with respect to the other; one being in motion with respect to the other, the motion being in a direction inclined to the line of intersection of the two boards. One of these boards is preferably of ample area and set horizontally, the second is upright close above it, and is preferably divided into detached sections alternately set at opposite angles with respect to the direction of movement of the first board. A mass of dough being placed on the horizontal board is by the motion thereof brought into contact with the upright board. There is nothing covering the dough from view or from access and no parts which embrace or compress the dough. The molding effect is attained by the frictional pull of the under board on the mass and the frictional restraint of the upright barrier board, which (owing to the slight distance between the point of application of the pull to the mass by the under board and the point of application of the resistance offered by the upright board) causes rotating motions to be engendered, which tend to occur both about a vertical axis and a horizontal axis. A resultant rotation follows, carrying the mass along the intersection of the boards, during which the conjoint effect of the pull of the one board, the resistance of the other, the plastic condition of the mass, the weight of the mass and the slip of the surface of the mass upon each of the boards produces internal and external effects upon the mass, forming a skin thereon and shaping it round. The effect will be varied if the angle between the upright board and the motion of the under board be changed, and the invention comprises simple means for changing this angle. A different effect may also be obtained by causing the molding surface of the upright board to be in motion.

Figure 2:
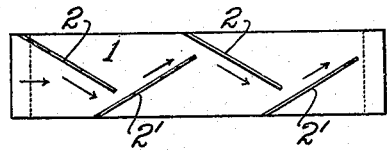
Figure 3:
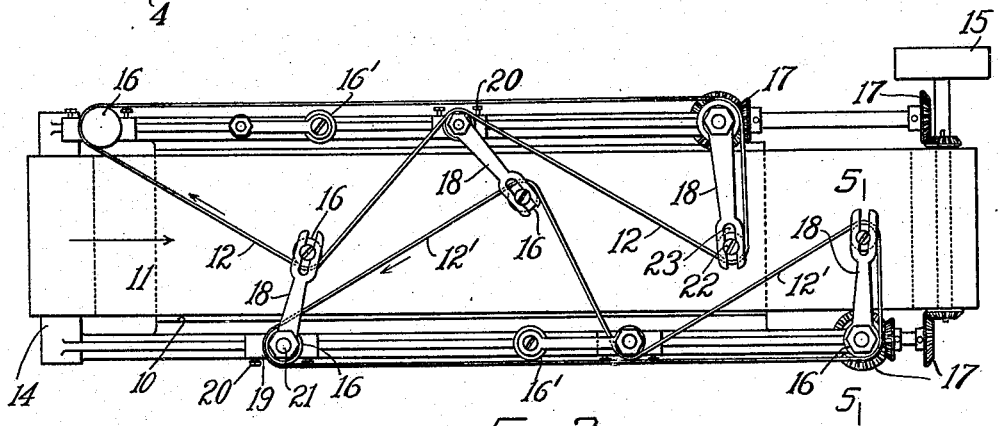
Figure 4:
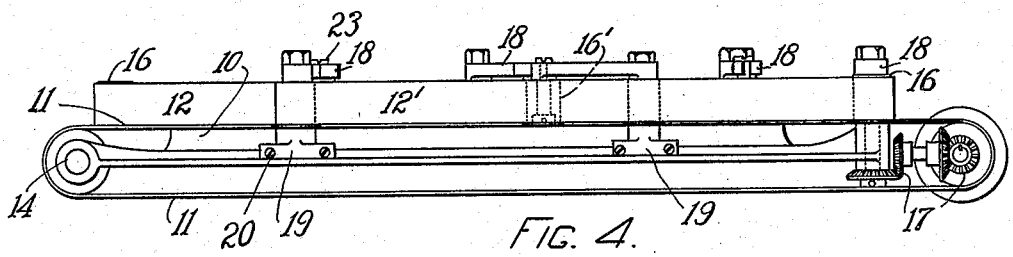
Figure 5:
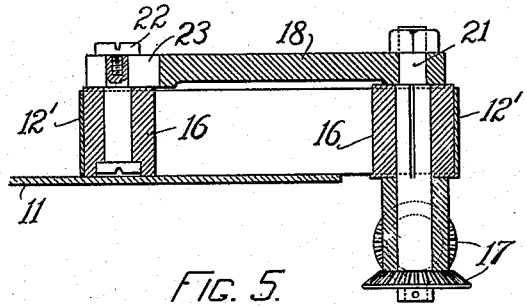

In the accompanying drawings:—Figure 1 represents diagrammatically in perspective an embodiment of the invention; Fig. 2 represents a similar embodiment in plan; Fig. 3 is a plan showing apparatus with both boards moving; Fig. 4 is a side elevation of the same; and Fig. 5 is an elevation of a detail in section on the line 5—5 of Fig. 3.

The word "board" is used herein in a broad sense meaning not merely wood but any material; and the material represented in the drawings, in Fig. 1, is a flexible belt which may have a leather or felt surface; and in Fig. 3 all belts may be so.

In Fig. 1 the part 1 represents a horizontal belt or carrier which forms the under molding board and the other molding board consists of wooden barriers 2, 2' suitably supported above it, the under board being in motion around rollers 4. A mass of dough put on at 3 will travel through the course shown by arrows 3'.

In Fig. 3 is shown a molding board 11 and upright molding boards 12, 12'. All consist of belts, the former supported by a bed or platen 10 and passing over rollers 14 driven by a pulley 15. The latter pass around rollers 16 and are driven by gearing 17 from the same pulley 15. Certain of the pulleys 16 are supported adjustably on arms 18 which in turn are supported on the side frame of the machine as at 19. They are adjustable longitudinally to any desired position thereon, for which fastening screws 20 are shown, and are adjustable angularly about pivots 21. The rollers 16 upon said arms 18 are also adjustable readily thereon and may be fastened by screws 22 in slots 23. The several belts move in the directions indicated by the arrows. The effect of the movement of the belts 12, 12' is to intensify the molding action on a mass of dough and at the same time to delay the progress of dough through the apparatus, thus doubly increasing the molding effect attained within a specified length of apparatus. If additional effect is desired the apparatus might be built longer. By changing the adjustments of the arms and rollers 16 the angular relation of the working portions of belts 12, 12' to each other and to the line of motion of belt 12 may be varied at will, according to the needs of the work in hand. It is contemplated that not all of the sections of belts 12, 12' will be in use for all kinds of work but for small sizes only a small number of the sections will be needed and the later sections will be swung aside out of the path of dough which has passed the first sections; but increased molding effect may be attained by swinging one or more additional sections into action. A different effect may also be attained by varying the angles at which the sections are set, or by disconnecting the power as by loosening gears 17, or their driving gears, so that they turn loose upon the shaft, and thus using one or both of the belts 12, 12' as a stationary board. Upon changing the adjustment of any of the pulleys 16 the belt tighteners 16' may be moved as necessary to accommodate the change.

The patent is not to be limited to the particular method of providing relative motion between the under and upright boards here shown, but the form here shown is preferred; and variations may be made in other respects from the materials and the form and arrangement here described without departing from the scope of the invention and patent.

I claim:—

1. Apparatus of the class described, comprising two molding boards, one set with its working surface edgewise with respect to the other, and means to impart motion to one relative to the other in a direction inclined to their line of intersection, in combination with means to impart motion to the other board in the direction of said line of intersection.

2. Apparatus of the class described, comprising two molding boards, one set with its working surface edgewise with respect to the other, and means to impart motion to one relative to the other in a direction inclined to their line of intersection, the one board constituting a support for material and the other being an endless belt and there being means to move said belt in the direction of its line of intersection with the supporting board.

3. Apparatus of the class described, comprising two molding boards, one set with its working surface edgewise with respect to the other, and means to impart motion to one relative to the other in a direction inclined to their line of intersection, the one board constituting a support for material and the other being an endless belt and there being means to move said belt in the direction of its line of intersection with the supporting board, and in direction contrary to that of the progress of material through the apparatus.

4. Apparatus of the class described, comprising two molding boards, one set with its working surface edgewise with respect to the other, and means to impart motion to one relative to the other in a direction inclined to their line of intersection, one of the boards constituting a support for material and the other being an endless belt, in combination with guide pulleys therefor supported on the apparatus.

5. Apparatus of the class described, comprising two molding boards, one set with its working surface edgewise with respect to the other, and means to impart motion to one relative to the other in a direction inclined to their line of intersection, one of the boards constituting a support for material and the other being an endless belt, in combination with pivotally adjustable arms, and guide pulleys thereon located over the supporting board and supporting the belt which comprises the other board.

In testimony whereof I hereto affix my signature, in presence of two witnesses.

GUNTHER H. PETRI.

Witnesses:
    JOSEPH T. BRENNAN,
    EVERETT E. KENT.